(12) United States Patent
Li et al.

(10) Patent No.: US 9,894,125 B2
(45) Date of Patent: Feb. 13, 2018

(54) REDISTRIBUTING SOURCES FOR ADAPTIVE BIT RATE STREAMING

(71) Applicant: Broadcom Corporation, Irvine, CA (US)

(72) Inventors: Yong Li, San Diego, CA (US); Xuemin Chen, Rancho Santa Fe, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 288 days.

(21) Appl. No.: 13/960,756

(22) Filed: Aug. 6, 2013

(65) Prior Publication Data

US 2015/0012615 A1 Jan. 8, 2015

Related U.S. Application Data

(60) Provisional application No. 61/842,929, filed on Jul. 3, 2013.

(51) Int. Cl.
*H04L 29/06* (2006.01)
(52) U.S. Cl.
CPC ............ *H04L 65/60* (2013.01); *H04L 65/605* (2013.01); *H04L 65/607* (2013.01)
(58) Field of Classification Search
CPC  H04L 29/08072; H04L 29/06; H04L 29/0809
USPC ........................................................ 709/219
See application file for complete search history.

(56) References Cited

U.S. PATENT DOCUMENTS

| | | | | |
|---|---|---|---|---|
| 6,813,690 B1 * | 11/2004 | Lango | ................ | G06F 12/0866 707/999.103 |
| 7,080,158 B1 * | 7/2006 | Squire | ................ | H04L 67/2814 370/389 |
| 8,341,255 B2 * | 12/2012 | Gopalakrishnan | .. | H04L 65/4084 709/200 |
| 9,172,674 B1 * | 10/2015 | Patel | .................. | H04L 61/1511 |
| 2008/0235400 A1 * | 9/2008 | Slocombe | .............. | H04L 29/06 709/245 |
| 2009/0199250 A1 * | 8/2009 | Assouline | ............. | H04N 7/173 725/96 |
| 2011/0082946 A1 * | 4/2011 | Gopalakrishnan | .. | H04L 65/4084 709/231 |

(Continued)

*Primary Examiner* — Nicholas Taylor
*Assistant Examiner* — Chong G Kim
(74) *Attorney, Agent, or Firm* — McDermott Will & Emery LLP (57) ABSTRACT

A system includes one or more network media service devices, with each network media node operably connected upstream to one or more gateway devices. At least one of the network media service devices is configured to intercept an ABR-related request to receive digital media content for a media channel sent from a client set top box to a remote ABR server located upstream from the at least one network media device, identify a second gateway device that is storing the digital media content, the second gateway device having previously received the digital media content from the remote ABR server, and return a network address of the second gateway device to the client set top box for use by the client set top box to receive the digital media content from the second gateway device. In various implementations, the network address is returned in connection with an HTTP response indicating a redirection to the network address.

21 Claims, 6 Drawing Sheets

(56) References Cited

U.S. PATENT DOCUMENTS

| | | | |
|---|---|---|---|
| 2011/0225311 A1* | 9/2011 | Liu | H04L 45/125 709/231 |
| 2011/0280216 A1* | 11/2011 | Li | H04L 12/14 370/331 |
| 2012/0284371 A1* | 11/2012 | Begen | H04L 65/1069 709/219 |
| 2012/0303818 A1* | 11/2012 | Thibeault | G06F 9/5072 709/226 |
| 2013/0041972 A1* | 2/2013 | Field et al. | 709/213 |
| 2013/0046883 A1* | 2/2013 | Lientz | H04L 41/0816 709/224 |
| 2013/0054728 A1* | 2/2013 | Amir | H04N 21/2183 709/213 |
| 2013/0060911 A1* | 3/2013 | Nagaraj | H04N 21/234327 709/219 |
| 2013/0097309 A1* | 4/2013 | Ma | H04L 29/08099 709/224 |
| 2013/0111513 A1* | 5/2013 | Gaude | H04N 7/173 725/14 |
| 2013/0144984 A1* | 6/2013 | Zhao | H04L 65/608 709/219 |
| 2013/0254341 A1* | 9/2013 | Ramakrishnan | H04L 47/25 709/219 |
| 2013/0282890 A1* | 10/2013 | Ma | H04L 43/12 709/224 |
| 2013/0339529 A1* | 12/2013 | Rizzo | H04L 67/322 709/226 |
| 2013/0346539 A1* | 12/2013 | Sivasubramanian | H04L 67/2842 709/213 |
| 2014/0019576 A1* | 1/2014 | Lobo | H04L 67/2842 709/213 |
| 2014/0089465 A1* | 3/2014 | Van Brandenburg | H04L 65/605 709/217 |
| 2014/0098685 A1* | 4/2014 | Shattil | H04L 67/327 370/252 |
| 2014/0160956 A1* | 6/2014 | Chen | H04N 21/4363 370/252 |
| 2014/0258449 A1* | 9/2014 | Holden | H04L 65/60 709/217 |
| 2014/0280688 A1* | 9/2014 | Mao | H04L 67/2847 709/214 |
| 2014/0280764 A1* | 9/2014 | Dasher | H04L 65/60 709/219 |
| 2014/0282777 A1* | 9/2014 | Gonder et al. | 725/109 |
| 2014/0289319 A1* | 9/2014 | Richardson | H04L 67/2814 709/203 |
| 2014/0359081 A1* | 12/2014 | Van Deventer | H04N 21/6587 709/219 |
| 2014/0380395 A1* | 12/2014 | Desmauts | H04L 65/605 725/116 |
| 2015/0012593 A1* | 1/2015 | Phillips | H04L 41/509 709/204 |
| 2015/0070585 A1* | 3/2015 | Sharif-Ahmadi | G08C 17/02 348/564 |
| 2015/0350291 A1* | 12/2015 | Contreras Murillo | H04L 67/2814 709/219 |

\* cited by examiner

REDISTRIBUTING SOURCES FOR ADAPTIVE BIT RATE STREAMING

CROSS-REFERENCE TO RELATED APPLICATIONS

The present application claims the benefit of priority under 35 U.S.C. § 119 from U.S. Provisional Patent Application Ser. No. 61/842,929 entitled "Redistributing Sources for Adaptive Bit Rate Streaming," filed on Jul. 3, 2013, the disclosure of which is hereby incorporated by reference in its entirety for all purposes.

BACKGROUND

A traditional subscriber data network is configured in a tree topology, with the network rooted at a root node (e.g., at an optical line terminator) and branching out to cable media converters (CMCs), and ultimately to gateways (GWs) that serve leaf devices such as set-top boxes (STBs) and other operably connected computing devices (e.g., personal computers and mobile devices). Because such networks are optimized for multicast-based services, certain challenges are present when providing unicast-based services such as adaptive bit rate (ABR) streaming from an adaptive bit rate (ABR) server at the root node. For example, bandwidth requirements at the root node exponentially increase with each additional branch in the network. Consequently, as the number of branches and users is scaled, the amount of bandwidth required for providing services to those users exponentially increases along the branches leading towards the root node.

SUMMARY

The subject technology provides a system and method identifying media resources for providing adaptive bit rate (ABR) streaming to client devices. The method may comprise intercepting an ABR-related request to receive digital media content for a media channel sent to a remote ABR server from a client device, the request being sent through a first gateway device, determining that a second gateway device is storing the digital media content requested by the client device, the second gateway device having previously received the digital media content from the remote ABR server, and returning a network address of the second gateway device to the client device for use by the client device in receiving the digital media content from the second gateway device, wherein the first and second gateway devices are operably connected such that a request to receive the stored digital media content from the second gateway device that is sent through the first gateway device is routed to the second gateway device. Other aspects include corresponding systems, apparatus, and computer program products for implementation of the computer implemented method.

In another aspect, a method may comprise receiving an ABR-related request for digital media content for a media channel from a first client device, receiving the digital media content from a remote ABR server on behalf of the first client device, determining that the digital media content should be stored in a local storage based on one or more media indicators, storing the digital media content, in response to the determining, in the local storage in connection with providing the digital media content to the first client device, receiving an ABR-related request for the digital media content from a second client device via a remote gateway device, and providing, from the local storage, the digital media content to the second client device as a series of ABR content segments using a local ABR server. Other aspects include corresponding systems, apparatus, and computer program products for implementation of the method.

In further aspects, a system may comprise one or more network media service devices, each network media node operably connected upstream to one or more gateway devices. Accordingly, at least one of the network media service devices is configured to intercept an ABR-related request to receive digital media content for a media channel sent to a remote ABR server located upstream from the at least one network media device, the ABR-related request being sent from a client set top box through a first gateway device, determine that a second gateway device is storing the digital media content, the second gateway device having previously received the digital media content from the remote ABR server, and return a network address of the second gateway device to the client set top box for use by the client set top box to receive the digital media content from the second gateway device, wherein the network address is returned in connection with an HTTP response indicating a redirection to the network address, and wherein the first and second gateway devices are operably connected such that a request to receive the stored digital media content from the client set top box that is sent through the first gateway device is routed to the second gateway device.

In further aspects, a device may comprise a local storage and a local ABR server. The device may be configured to receive an ABR-related request for digital media content for a media channel from a first client set top box, receive the digital media content from a remote ABR server on behalf of the first client set top box, determine that the digital media content should be stored in the local storage based on one or more media indicators, store (e.g., in response to the determining) the digital media content in the local storage in connection with providing the digital media content to the first client set top box, receiving an ABR-related request for digital media content from a second client set top box via remote gateway device, and providing, from the local storage, the digital media content to the second client set top box as a series of ABR content segments using the local ABR server.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

In a subscriber data network, a client device (e.g., a digital cable television set top boxes) sends ABR-related requests for digital media content along a request path through a local gateway (e.g., a cable modem within a home network) and upstream network media service device (e.g., a CMC), to an ABR server that provides digital content for a content delivery network (CDN). Each ABR-related request may be in the form of, for example, an HTTP GET request method for retrieving one or more segments of the digital media content from the ABR server.

According to the subject technology, gateway devices (and/or CMCs) are configured (or modified) to cache digital media content as the content is received from the ABR server and transmitted through the gateway devices to downstream client devices. A CMC is modified to intercept ABR requests sent to the ABR server from a downstream client device, and to provide a new network address for retrieving the desired content from another device closer to the client device instead of the ABR server. If the digital media content can be retrieved from, for example, a gateway device local to the client device (or another CMC) then data traffic may be reduced between the ABR server and the CMC. Accordingly, media resources (e.g. video storage and transcoders) may be shared, alleviating network congestion and providing for improved bandwidth and media quality from the ABR server.

Figure 1:
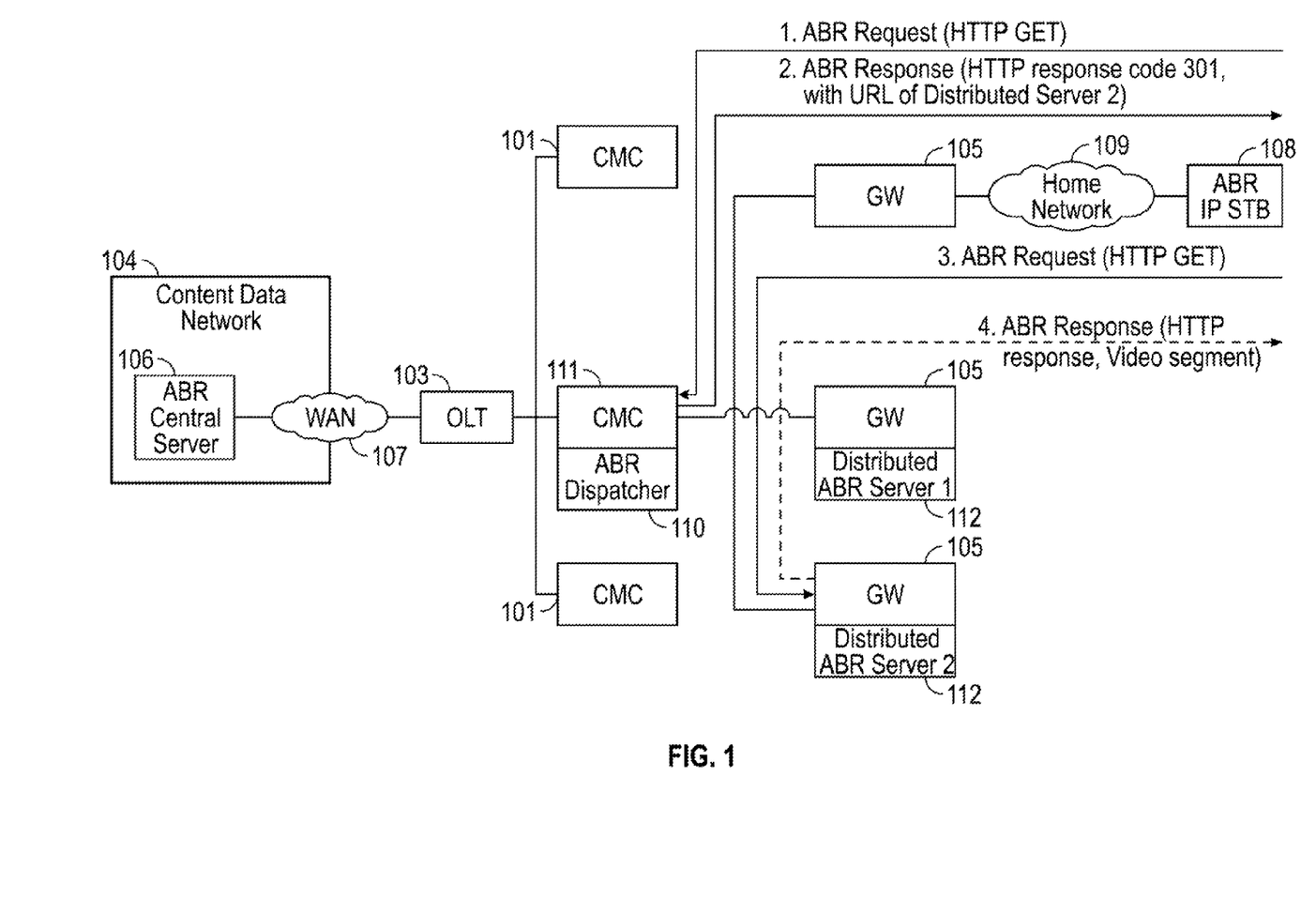
FIG. 1 depicts a diagram of an example subscriber data network, including gateway devices modified to cache content.
Figure 3:
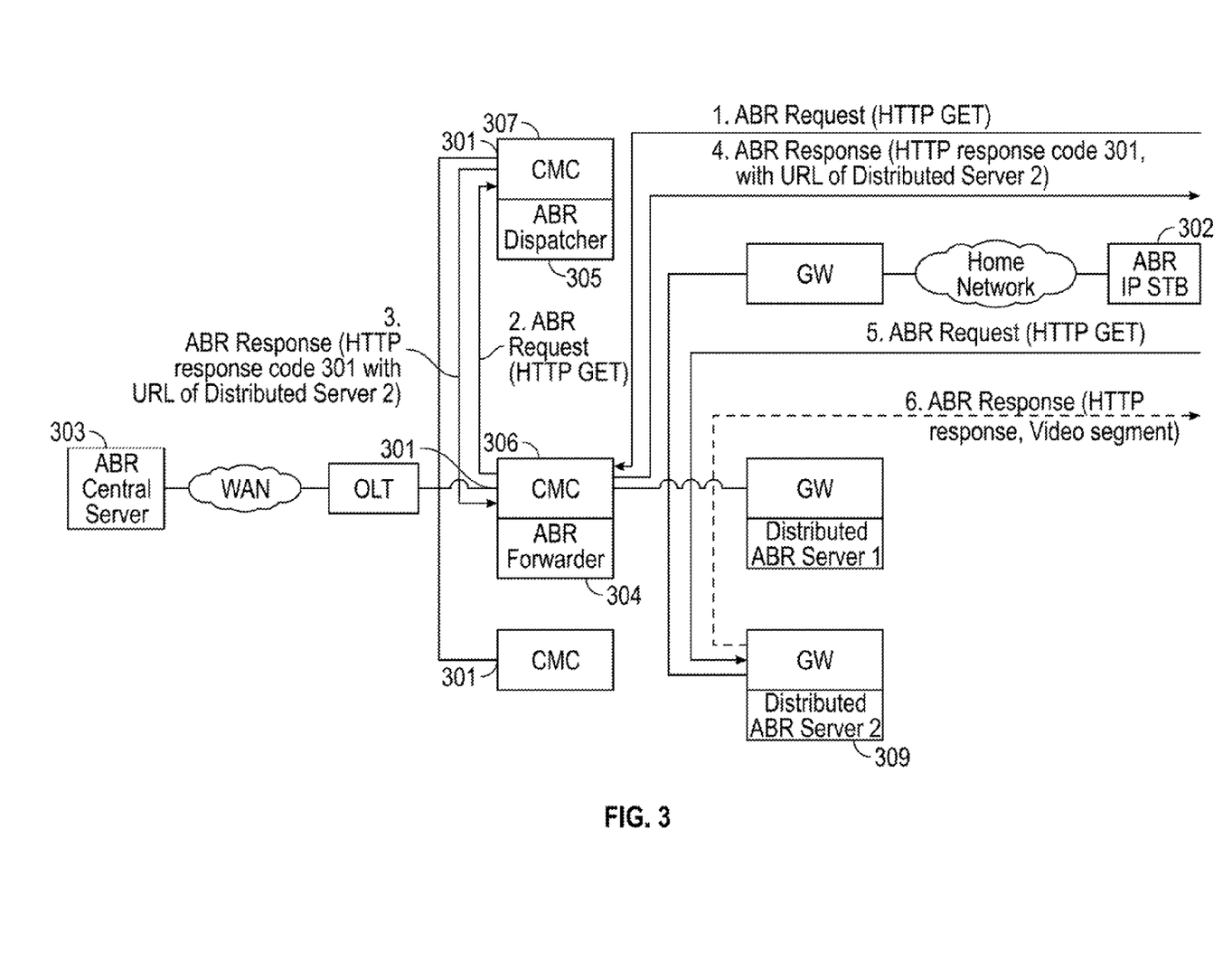
FIG. 3 depicts a diagram of an example subscriber data network, including a cable media converter modified to forward ABR requests received from downstream client devices.

For the purpose of this disclosure a first device is "upstream" from a second device if the first device is located closer to the root node than the second device in a tree topology, and a second device is "downstream" from the first device if the second device is further from the root node than the first device in the tree topology (see FIGS. 1 and 3).

FIG. 1 depicts a diagram of an example subscriber data network, including gateway devices modified to cache content, in accordance with one or more implementations of the subject technology. In the depicted example, multiple cable media converters (CMCs) 101 are connected to a passive optical network (PSN) 102 in a tree topology, extending from a service endpoint 103. Service endpoint 103 provides communication and signal conversion between a content delivery network (CDN) 104 and CMCs 101. In various aspects, service endpoint 103 may be an optical line terminal (OLT) that converts electrical signals received from CDN 104 to optical signals for broadcast over PSN 102 (e.g., via fiber optics) to CMCs 101. CDN 104 may be part of a cable TV system having a network infrastructure that utilizes Data Over Cable Service Interface Specification (DOCSIS) to provide high-speed data transfer to one or more CMC Groups, each group including a CMC 101, and tone or more corresponding gateway devices 105 and other remotely connected downstream devices served by the CMC.

CDN 104 includes a (remote) source ABR server 106 or other multimedia server operably connected to service endpoint 103 over a network 107 such as a LAN, WAN, or the Internet. Source ABR server 106 provides streaming media content over HTTP. Source ABR server 106 receives digital content (e.g., a live television feed) from a content source (not shown) and encodes the digital content into multiple streams, each segmented into small multi-second parts (e.g., between two (2) and ten (10) seconds in length) and provided at a different data rate (e.g., bit rate). Source ABR server 106 advertises the available source media streams of differing data rates by way of a source manifest file. The source manifest file includes a stream profile for each source media stream and a playlist that describes the segments (e.g., the order and length of the segments) available from source ABR server 106.

As previously described, one or more gateway devices 105 may be connected to a given CMC 101 as a CMC Group, with the CMC as the headend for the group. A gateway device 105 is configured to receive digital media content for one or more media channels from CDN 104 via a headend CMC 101 in a related branch of a corresponding tree topology, and transmit the content to one or more operably connected client devices 108 (e.g., set-top box/unit, laptop or tablet computer, smart phone or other mobile device, or a digital television or other display device having a computer embedded within or attached thereto) in the CMC Group. In one or more implementations, client devices 108 may be connected to one or more gateway devices 105 of the CMC Group via a home network 109, and provide digital media content to users via local viewing devices (e.g., a television receiver and display, personal computer, mobile device, or other device capable of playing digital media). Multiple gateway devices 105 may receive content from a single headend CMC, with each gateway device serving digital media content for a different branch within a tree topology of a subscriber network, and with each gateway device providing content to respective home network 109. As will be described in further detail, gateway device 105 is configured to receive streaming media ("IP streams") over an IP-based network (e.g., using TCP/IP, UDP, and the like) and cache the IP media content for future streaming to other client devices 108. In various implementations, a first client device in a first home network 109 may receive digital media content from a cache of a gateway device serving a second home network.

Figure 2:
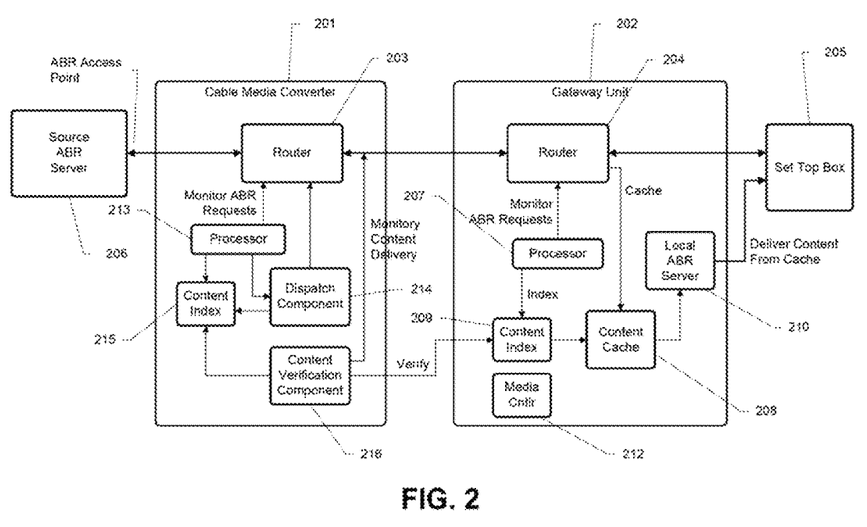
FIG. 2 depicts component diagrams for an example cable media converter and example downstream gateway device.

One or more CMCs 101 may be modified with an ABR dispatch component 110 that identifies which downstream gateway devices 105 in the corresponding CMC Group are currently storing digital media content, and for what media channels. In this regard, dispatch component 110 may continuously listen (e.g., sniff) packets transmitted through service endpoint 103 to other CMCs 101 over PSN 102. Dispatch component 110 is programmed to be aware of the capabilities of downstream gateway devices (e.g., within the same CMC Group). When digital media content is sent by ABR server 106 to a client device 108 through a gateway device 105 capable of storing media content, a media lookup table located at the corresponding CMC is updated with the network address of the gateway device, indexed by an identification for the digital media content. ABR dispatch component 110 may subsequently poll the gateway device to verify that the digital media content was indeed stored by the gateway device. Additionally or in the alternative, each gateway device 105 that is capable of storing digital media content may be configured with a media controller (see FIG.

2) that notifies ABR dispatch component 110 and/or updates the media lookup table when content is stored.

Dispatch component 110 may implement a database that contains information about destination addresses of different video content. The database may be part of dispatch component 110, located on CMC 111, or located on a separate computing device operably connected to dispatch component 110 or CMC 111 via, for example, a network connection. The database is used by dispatch component 110 to look up the redirect destination address for an ABR request.

In some implementations, the database may be configured remotely by the operator, according to the pre-determined whereabouts of the video content. In some implementations, the database may be dynamically constructed with the destination addresses of video content by snooping the ABR responses transmitted by upstream devices. For example, CMC 111 that hosts dispatch component 110 may "see" (e.g., receive) ABR responses transmitted on the fiber distribution network that connects all CMC's to service endpoint 103, regardless of whether the target of those responses is a client connected to CMC 111.

In some implementations, the local database may be dynamically updated with new information created by a remote CMC. For example, the remote CMC constructs its local database using any of the previously described implementations, and then propagates (e.g., pushes) the new information to CMC 111 for storage in the local database. Additionally or in the alternative, the CMC 111 pools (e.g., pulls) the remote CMC for any new database updates.

Additionally or in the alternative, a gateway device 105 may also implement its own local database that contains information about the destinations addresses of the ABR servers within the same CMC Group that store different video content. Such a database may be constructed and updated any of the previously described implementations. In at least one example, a gateway device 105 may first query its own database for the target ABR server whenever the gateway device receives an ABR request from a connected client. If no match is found, then the gateway device may escalate the request to the corresponding headend CMC 101 within the same CMC Group.

With further reference to the example directional flows indicated in FIG. 1, client device 108 sends an (1) ABR request for digital media content to ABR server 106 through a modified CMC 111. Modified CMC 111 intercepts the request. The ABR request may include an HTTP uniform resource locator (URL) corresponding to one or more local content data segments of a media stream. Each client HTTP URL request requests transmission of a respective data segment at a selected one of the local ABR formats provided by the manifest file.

On intercepting an ABR request, modified CMC 111 identifies a content distribution server 112, located on a respective gateway device 105, that is currently storing the digital media content requested by client device 108. Accordingly, a network address for content distribution server 112 may be identified in the previously described media lookup table. Modified CMC 110 then (2) returns the network address of content distribution server 111 (e.g., distribution server 2 of FIG. 1) to client device 108 so that the client device may request the digital media content directly from the content distribution server. In the example implementation, the network address is returned in connection with an HTTP response code indicating a redirection to the network address (e.g., HTTP response code 301 with the URL corresponding to content distribution server 111).

Client device 108 receives the HTTP response code indicating redirection to the network address of content distribution server 112, and generates another ABR request for the digital media content using the network address. Accordingly, client device 108 (3) sends the ABR request to the gateway device 105 at which content distribution server 112 is located. Content distribution server 112 have a different or share the same network address as gateway device 105. Content distribution server 112 identifies the digital media content within its local storage cache (e.g., on the corresponding gateway device), and (4) sends an ABR response (e.g., an HTTP response), including the originally requested content data segment. In various implementations, the redirection includes an HTTP response code 301, indicating that the location permanently moved. Accordingly, further HTTP requests for content segments are made directly to content distribution server 112 (the location of the redirection).

FIG. 2 depicts component diagrams for an example cable media converter (CMC) 201 and example downstream gateway device 202, in accordance with one or more implementations of the subject technology. CMC 201 and gateway device 202 include a router 203 and 204, respectively, for routing network communications between a client device 205 and a source ABR server 206 located, for example, in CDN 104. Gateway device 202 may be operably connected to one or more other gateway devices via CMC 201 (and other client devices) such that a request sent through a different gateway device that identifies gateway device 202 is routed to gateway device 202.

Gateway device 202 includes a gateway processor 207, local content storage 208, a memory medium 209 for storing a gateway content index, and a local ABR server 210. Local ABR server 210 is configured to provide streaming media content over HTTP from local content storage 208. Similar to source ABR server 206, local ABR server 210 encodes the digital content into multiple streams of differing data rates (e.g., with each segmented into small multi-second parts) and advertises the available streams by way of a local manifest file to operably connected client devices.

Gateway processor 207, in connection with router 204 and other internal components of gateway device 202, is configured to receive an ABR-related requests (e.g., HTTP GET) from client devices for digital media content, forward the requests (via routers 204 or 203) to source ABR server 206, and receive the digital media content from ABR server 206 on behalf of the client devices. In some implementations, receiving a request may include gateway processor 207 monitoring network activities on router 204 for ABR-related requests and intercepting the request before it is passed upstream to a different destination.

Gateway processor 207 determines whether digital media content received from source ABR server 206 should be stored in the local content storage 208 based on one or more media indicators. For example, the digital media content may be stored based on a determination that a threshold number of content subscribers serviced by CMC 201 subscribe to a subscriber media service package associated with the media channel. If the threshold is met then gateway processor 207 stores the digital media content in local content storage 208 in connection with providing the digital media content to the requesting client device. For example, if the digital media content is for a boxing match only available by subscribing to a "sports" or "boxing" package, and the threshold number of subscribers downstream from CMC 201 subscribe to the "sports" or "boxing" package, then gateway 202 automatically stores the content for the game in local content storage 208 in parallel with delivery of the content to client device.

Gateway device 202 may be operably connected to one or more other gateway devices via a network connection between gateway device 202 and CMC 201, and between CMC 201 and the one or more other gateway devices. In this manner, the gateway devices are operably connected such that a request sent through a first gateway device that identifies a second gateway device is routed to the second gateway device. Accordingly, a gateway device 202 may receive an ABR-related request for digital media content from client device 205 via a remote gateway device. In some instances, the request may be intercepted, and in other instances the request may be sent directly to gateway device 202 (e.g., the request may include a URL of gateway device 202).

On receiving a request for digital media content, gateway device 202 may access the content index stored on memory medium 209 to determine whether the content is stored locally in local content storage 208. If the requested digital media content is stored then gateway 202 provides the digital media content to the requesting client device. For example, the request may be directed by router 204 to local ABR server 210, and the ABR server provides the content as a series of ABR content segments to client device 205 in the previously described manner.

In some implementations, gateway device 202 may be configured with a media controller 212. Media controller 212 may be operably connected to one or more upstream CMC devices, and configured to when digital media content is stored in content storage 208, inform the upstream CMC devices that the digital media content has indeed been stored in content storage 208. In this manner, upstream CMCs are made aware of what content is available at the downstream gateway devices. In some aspects, media controller 212 may also communicate the subscriber media service package associated with the media channel for the digital content so that the upstream CMCs are aware of whether to forward requests for content to gateway 202 based on whether the requesting subscriber subscribes to the media service package.

In the depicted example, CMC 201 includes router 203, a CMC processor 213, a content dispatch component 214, a memory medium 215 for storing a CMC content index, and a content verification component 216. Similar to gateway device 202, CMC processor 213 is configured to monitor router 203 for ABR-related data traffic related to one or more media channels. In this regard, CMC 201 is aware of which downstream gateway devices are requesting or receiving content for the media channels.

CMC 201 is configured to receive ABR-related content requests for media channels originating from a client device served by a downstream gateway device, and to identify another downstream gateway device that previously received the digital media content from source ABR server 206, and which is currently storing the digital media content. CMC 201 may then provide the network address of the identified gateway device to the client device. Similar to gateway device 202, receiving the request may include CMC processor 213 monitoring network activities on router 203 for ABR-related requests and intercepting the request before it is passed upstream to source A BR server 206.

CMC 201 may identify which gateway devices are storing content by monitoring data traffic through router 203, periodically polling downstream gateway devices, or receiving notifications from downstream gateway devices that content has been stored. For example, when CMC 201 detects data traffic between source ABR server 206 and gateway unit 202 that includes content segments for a media program of a media channel, CMC 201 may identify gateway device 202 as a storage location for the corresponding media content by storing a network address of the identified gateway device, indexed by an identification for the digital media content. In various aspects, the network address and corresponding index may be stored on memory medium 215. Memory medium 215 may be a hard drive, flash memory, or other type of tangible memory medium embedded within or operably connected to CMC 201.

The CMC content index may be unverified or verified. Accordingly, on or subsequent to detecting the data traffic, CMC processor 213 may instruct content verification component 216 to verify that the content was stored at gateway device 202. Content verification component 216 is configured to poll, for example, gateway context index (e.g., in memory medium 209) of gateway device 202 to determine if gateway content storage 208 is storing the digital media content. Polling may be performed in response to detecting the previously described data traffic or periodically to determine what digital content is stored on downstream gateway devices.

In other aspects, content verification component 216 may be configured to receive indications related to the storage of digital media content from operably connected downstream gateway devices 202. For example, content verification component may receive a notification from media controller 212 that gateway device 202 recently stored or is in the process of storing certain digital media content for a media channel. The notification may include channel information including the time, date, program length, title of the program, and/or subscriber media service package associated with the content.

The previously described features of determining the downstream location of stored content may be conducted by content dispatch component 214. Content dispatch component 214 may be configured to listen to upstream content feeds provided to downstream gateway or client devices (e.g., by packet sniffing). Accordingly, in various implementations, content dispatch component 214 is aware of which content programs have been sent to each downstream gateway device, and is aware of which downstream devices are capable of storing digital media content. Content dispatch component 214 may be configured, for example, to communicate directly with, or receive notifications from, gateway media controllers 212 located on downstream gateway devices. Content dispatch component 214 may be implemented as hardware in CMC 201, or as software instructions executed by CMC processor 213.

When a ABR-related request is received from a client device for digital media content dispatch component 214 determines whether the digital media content has been stored by a downstream gateway device by, for example, performing a lookup in the CMC content index by an identifier for the requested digital media content. If an index for the content exists then content dispatch component 214 returns a network address of the gateway device storing the digital media content to the requesting client device for use by the client device in receiving the digital media content from the second gateway device. As described previously, the network address may be returned in connection with an HTTP response indicating a redirection to the network address.

While CMC 201 and gateway device 202 are depicted in FIG. 2 as separate devices, it is understood that, in various implementations, CMC 201 may include the same or similar features as gateway device 202, and gateway device 202 may include the same or similar features as CMC 201. In the same regard, CMC 201 and gateway device 202 may be implemented as a single device or system that includes all the features of both devices.

CMC 201 and/or gateway device 202 may be implemented as, or include, a computing device (e.g., desktop, server, laptop, notebook, tablet computer) or other device connected to a network (e.g., a LAN, WAN, or the Internet) and configured to receive streaming media from an external source. CMC 201 is configured to convert one type of signal to a different type of signal. For example, CMC 201 may convert a fiber optic signal to an Ethernet signal for use by one or more downstream gateway devices. Client devices 205 may include a cable television set-top-box that receives, processes, and distributes television signals to one or more non-IP enabled viewing devices (e.g., a televisions), and distributes streaming media to one or more locally connected ABR client devices (for example, a desktop, laptop, notebook, or tablet computer, smart phone, PDA, a television or other display device having a computer embedded within or attached thereto, or the like.) Client device 205 may be connected to gateway device 202 via coaxial cable, fiber optic, radio frequency, twisted pair, or other infrastructure suitable for audio visual transmission.

FIG. 3 depicts a diagram of an example subscriber data network, including a cable media converter modified to forward ABR requests received from downstream client devices, in accordance with one or more implementations of the subject technology. In the depicted example, each CMC 301 in the request path (between client device 302 and a source ABR server 303) is configured with an ABR forwarder component 304 which forwards requests to a modified CMC 305 configured with an ABR dispatcher component 305. Modified CMC 305, including ABR dispatch component 306, is responsible for identifying a CMC 301 or downstream gateway device 307 currently storing the requested digital media content, and for providing the network address of that CMC or downstream gateway device to the client device in the previously described manner.

According to one or more implementations, client device 302 sends an (1) ABR request for digital media content to source ABR server 303 through CMC 308, which includes ABR forwarder component 304. As described previously, the ABR request may include an HTTP uniform resource locator (URL) corresponding to one or more content data segments of a media stream for a media program. CMC 308 receives (e.g., intercepts) the request. On receiving the ABR request, CMC 308 forwards the ABR request to CMC 305, which is modified to include ABR dispatcher component 306. As depicted in FIG. 3, CMC 308 is operably connected to and downstream from source ABR server 303. ABR dispatcher component 306 identifies a content distribution server 309, located on a respective gateway device that is currently storing the digital media content requested by client device 302. Accordingly, a network address for content distribution server 309 may be identified in the previously described manner (see FIG. 2). ABR dispatcher component 305 then (3) returns the network address of content distribution server 309 to CMC 308, and CMC 308 returns the network address to client device 302 so that the client device may request the digital media content directly from content distribution server 309.

Figure 4:
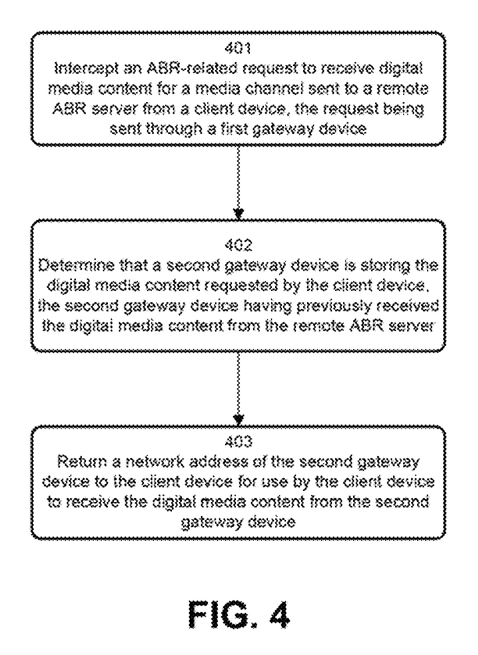
FIG. 4 depicts a flowchart of an example process for identifying media resources for providing adaptive bit rate streaming services.

FIG. 4 depicts a flowchart of an example process for identifying media resources for providing adaptive bit rate streaming services, in accordance with one or more implementations of the subject technology. The blocks of FIG. 4 do not need to be performed in the order shown. It is understood that the depicted order is an illustration of one or more example approaches, and are not meant to be limited to the specific order or hierarchy presented. The blocks may be rearranged, and/or or more of the blocks may be performed simultaneously.

According to one or more implementations, one or more blocks of FIG. 4 may be executed by cable media converter 201 or other device of the subject technology located at a network node between a client device (e.g., a set top box) and a source ABR server. Similarly, a non-transitory machine-readable medium may include machine-executable instructions thereon that, when executed by a computer or machine, perform the blocks of FIG. 4. Accordingly, the blocks of FIG. 4 may be performed within the context of using various network devices to identify previously stored digital media content across a subscriber data network, to reduce network congestion and share media resources while providing ABR streaming to client devices in the network.

According to FIG. 4, an ABR-related request to receive digital media content for a media channel sent to a remote ABR server from a client device is (601) intercepted, the request being sent from the client device through a first gateway device. The request may be an HTTP request made to a network address corresponding to the remote ABR server for content segments of a digital media stream for a media program.

A second gateway device is determined (602) to be storing the digital media content requested by the client device. In this example, the second gateway device has previously received the digital media content from the remote ABR server, and the first and second gateway devices are operably connected such that a request to receive the stored digital media content from the second gateway device that is sent through the first gateway device is routed to the second gateway device.

Prior to or in connection with the identification of the second gateway device, the network may be monitored for data traffic related to the media channel. When the related data traffic is detected, the second gateway may be identified as a destination for the data traffic, and the second gateway device polled to verify whether that the content for the media channel was stored at the second gateway device. Once verified, the verified content is associated with the second gateway in a digital media index (e.g., stored on memory medium 209 or 215). Accordingly, determining that the second gateway is storing the digital media content may include accessing the digital media index.

In some implementations, determining that the second gateway device is storing the digital media content may include forwarding the ABR-related request to a dispatch device (e.g., CMC 307 of FIG. 3) operably connected to and downstream from the remote ABR server, and receiving the network address of the second gateway device from the dispatch device.

A network address of the second gateway device is (603) returned to the client device for use by the client device to receive the digital media content from the second gateway device. According to various aspects, the network address may be returned in connection with an HTTP response indicating a redirection to the network address (e.g., using response code "301" or "302"). In one or more implementations, a determination may be made as to whether a content subscriber associated with the client device subscribes to a subscriber media service package associated with the media channel before returning the network address.

Figure 5:
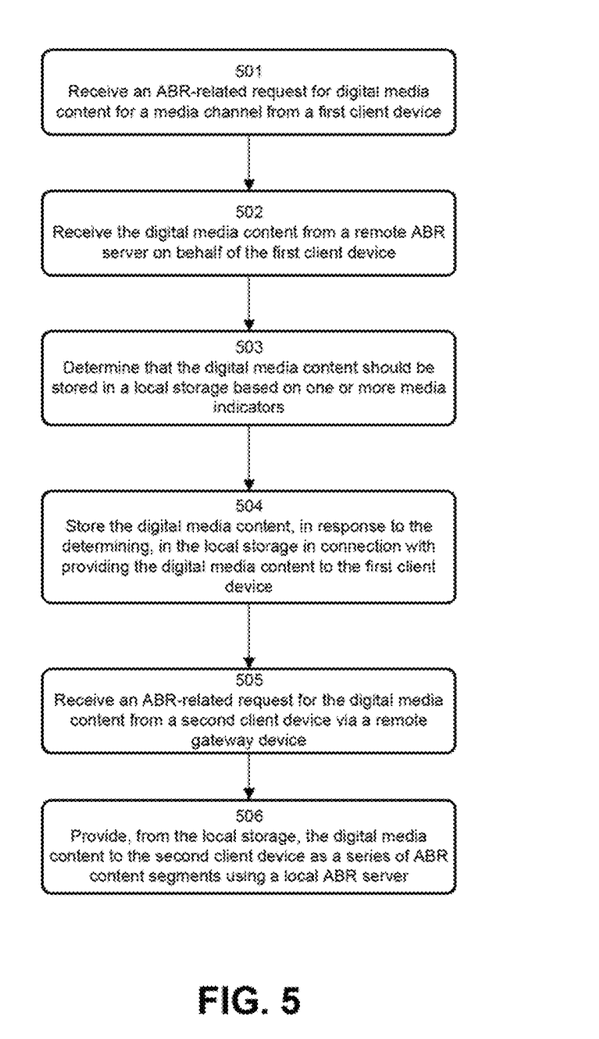
FIG. 5 depicts a flowchart of an example process for sharing ABR media resources.

FIG. 5 depicts a flowchart of an example process for sharing ABR media resources, in accordance with one or more implementations of the subject technology. The blocks of FIG. 5 do not need to be performed in the order shown. It is understood that the depicted order is an illustration of one or more example approaches, and are not meant to be limited to the specific order or hierarchy presented. The blocks may be rearranged, and/or or more of the blocks may be performed simultaneously.

According to one or more implementations, one or more blocks of FIG. 5 may be executed by gateway device 202 or other device of the subject technology located at a network node between a client device (e.g., a set top box) and a source ABR server. Similarly, a non-transitory machine-readable medium may include machine-executable instructions thereon that, when executed by a computer or machine, perform the blocks of FIG. 5. Accordingly, the blocks of FIG. 5 may be performed within the context of using various network devices to share media resources while providing ABR streaming to multiple client devices in the network.

According to FIG. 5, an ABR-related request for digital media content for a media channel is (501) received from a first client device. The first client device may be, for example, a client set top box located in a home of a content subscriber. The first client device may send the request to a remote ABR server via a gateway device local to the first client device (e.g., through gateway device 202). The local gateway device sends the request to the remote ABR server, and the digital media content is subsequently (502) received (e.g., by gateway device 202) from a remote ABR server on behalf of the first client device.

A (503) determination is made that the digital media content should be stored in a local storage based on one or more media indicators. In one or more implementations, the local storage is located at a network node upstream from the first client device, the network node comprising a local gateway device or a media converter upstream from the local gateway device. The one or more media indicators may include, for example, a determination that a threshold number of content subscribers (e.g., over 20) serviced by a common network media node subscribe to a media service (e.g., a "boxing" or "sports package") associated with the media channel.

The digital media content is (504) stored in the local storage (e.g., in response to the determination) in connection with providing the digital media content to the first client device. In some implementations, a network node upstream from the first client device is informed that the digital media content has been stored in the local storage.

An ABR-related request for the digital media content is (505) received from a second client device via a remote gateway device. The request may be sent from the second client device, upstream to the network node, and then redirected to the gateway device storing the digital media content. On receiving the request, the digital media content is (506) provided, from the local storage, to the second client device as a series of ABR content segments using a local ABR server. In implementations wherein the digital media content is stored based on a subscriber media service, a determination may be made that a content subscriber associated with the second client device subscribes to the media service before the digital media content is provided to the second client device.

Figure 6:
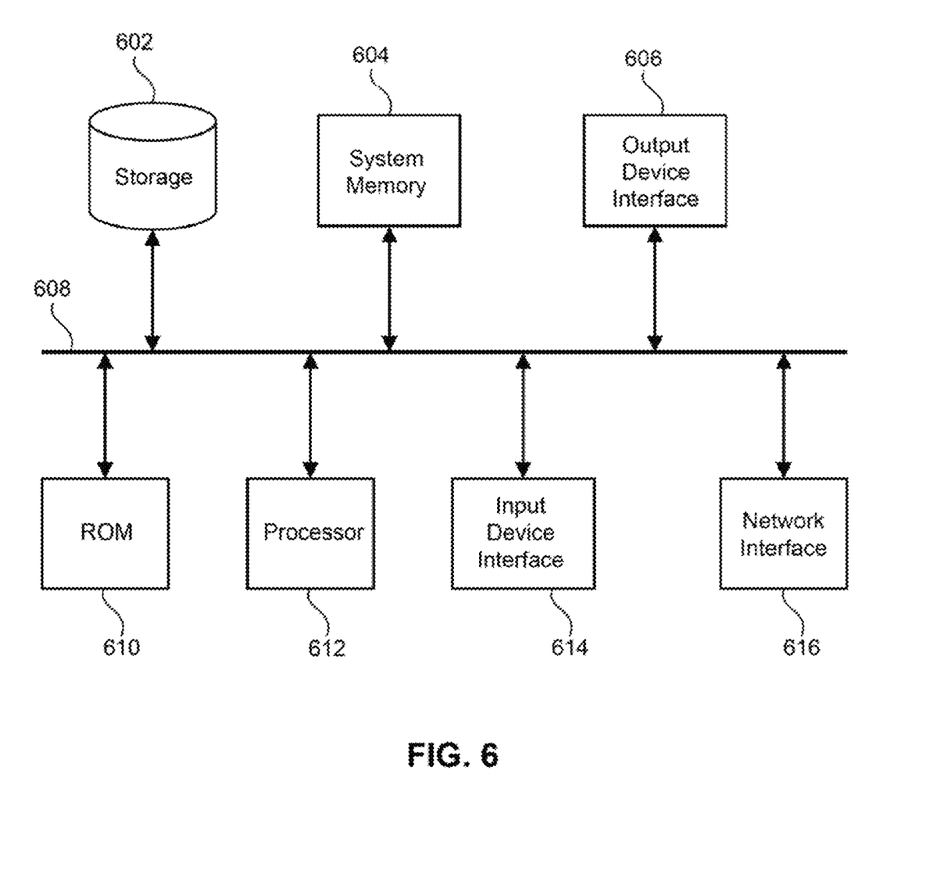
FIG. 6 is a diagram illustrating an example electronic system for use in connection with redistributing content provided by adaptive bit rate streaming services, including a processor and other related components.

FIG. 6 is a diagram illustrating an example electronic system 600 for use in connection with redistributing content provided by adaptive bit rate streaming services, including a processor and other related components, in accordance with one or more implementations of the subject technology. Electronic system 600, for example, is representative of the computing hardware embedded within, or for providing functional operation of, the previously described devices, including CMC 201, gateway unit 202, client device 205, and the like. In one or more aspects, electronic system 600 may be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects processing unit(s) 612 with ROM 610, system memory 604, and permanent storage device 602. From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores any of the instructions and data that processing unit(s) 612 needs at runtime. In one or more implementations, the processes of the subject disclosure are stored in system memory 604, permanent storage device 602, and/or ROM 610. From these various memory units, processing unit(s) 612 retrieves instructions to execute and data to process in order to execute the processes of one or more implementations.

Bus 608 also connects to input and output device interfaces 614 and 606. Input device interface 614 enables a user to communicate information and select commands to the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to a user or device can be any form of sensory feedback, such as visual feedback, auditory feedback, or tactile feedback; and input from the user or device can be received in any form, including acoustic, speech, or tactile input.

As shown in FIG. 6, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for identifying media resources for providing adaptive bit rate (ABR) streaming to client devices, comprising:
    intercepting a first request for a first segment of a plurality of segments of digital media content at a first stream profile that is indicative of a first bit rate, the first request being addressed to a remote ABR server and sent from a client device through a first gateway device, and the first segment having been listed in a manifest file previously provided to the client device;
    determining, in response to the intercepting, that a second gateway device is storing the digital media content at the first stream profile requested by the client device, the second gateway device having previously received the digital media content at the first stream profile from the remote ABR server, the first gateway device being configured to store at least one of the plurality of segments of the digital media content at a second stream profile, the second stream profile being indicative of a second bit rate; and
    returning a network address of the second gateway device to the client device for use by the client device to receive the first segment of the digital media content at the first stream profile from the second gateway device, wherein the first and second gateway devices are operably connected such that a second request, sent through the first gateway device, to receive the stored digital media content at the first stream profile from the second gateway device is routed from the first gateway device to the second gateway device.

2. The method of claim 1, further comprising:
    monitoring a network for data traffic;
    on detecting the data traffic, identifying the second gateway device as a destination for the data traffic;
    verifying that content was stored at the second gateway device, wherein the verified content comprises the digital media content at the first stream profile previously received from the remote ABR server; and
    associating the verified content with the second gateway device in a digital media index.

3. The method of claim 2, wherein determining that the second gateway device is storing the digital media content at the first stream profile comprises accessing the digital media index.

4. The method of claim 1, further comprising:
    receiving, from the second gateway device, an indication that the second gateway device is storing the digital media content at the first stream profile; and
    associating the digital media content at the first stream profile with the second gateway device in a digital media index, wherein determining that the second gateway device is storing the digital media content at the first stream profile comprises accessing the digital media index.

5. The method of claim 1, wherein determining that the second gateway device is storing the digital media content at the first stream profile comprises:
    forwarding the first request to a dispatch device operably connected to and downstream from the remote ABR server; and
    receiving the network address of the second gateway device from the dispatch device.

6. The method of claim 1, wherein the network address is returned in connection with an HTTP response indicating a redirection to the network address.

7. The method of claim 1, further comprising:
before returning the network address, determining that a content subscriber associated with the client device is subscribed to a media service associated with the digital media content.

8. A method for sharing adaptive bit rate (ABR) media resources, comprising:
receiving, by a first gateway device, a first request for a first segment of a plurality of segments of digital media content at a first stream profile from a first client device, wherein the first stream profile is indicative of a first bit rate;
receiving, by the first gateway device, the digital media content at the first stream profile from a remote ABR server on behalf of the first client device;
determining whether to store the digital media content at the first stream profile in a local storage of the first gateway device based on one or more media indicators;
storing the digital media content, in response to the determining, in the local storage in connection with providing the digital media content at the first stream profile to the first client device;
receiving, by the first gateway device, a second request for the digital media content at the first stream profile from a second client device via a remote gateway device, the second request being addressed to the remote ABR server and being redirected by an intermediate network device to the first gateway device without being provided to the remote ABR server, wherein the intermediate network device is distinct from the first gateway device and the remote gateway device; and
providing, from the local storage, the digital media content at the first stream profile to the second client device as a series of ABR content segments using a local ABR server.

9. The method of claim 8, wherein the one or more media indicators comprises a determination that a threshold number of content subscribers serviced by a common network media node subscribe to a media service associated with the digital media content, the local storage being at or downstream of the common network media node.

10. The method of claim 9, further comprising:
before the digital media content is provided to the second client device, determining that a content subscriber associated with the second client device is subscribed to the media service.

11. The method of claim 9, further comprising:
before the second request from the second client device is received, informing a network node upstream from the first client device that the digital media content at the first stream profile has been stored in the local storage.

12. The method of claim 9, wherein the first and second client devices are cable set top boxes.

13. A system for identifying media resources for providing adaptive bit rate (ABR) streaming to client devices, the system comprising:
one or more network media service devices, each network media service device operably connected upstream to one or more gateway devices;
wherein at least one network media service device of the one or more network media service devices is configured to:
intercept a first request for a first segment of a plurality of segments of digital media content at a first bit rate sent to a remote ABR server located upstream from the at least one network media service device, the first request being sent from a client set top box through a first gateway device, and the first segment being listed in a manifest file previously provided to the client set top box;
determine, in response to the intercepting of the first request, that a second gateway device is storing the digital media content at the first bit rate requested by the client set top box, the second gateway device having previously received the digital media content at the first bit rate from the remote ABR server; and
return a network address of the second gateway device to the client set top box for use by the client set top box to receive the first segment of the digital media content at the first bit rate from the second gateway device, wherein the network address is returned in connection with an HTTP response indicating a redirection to the network address,
wherein the first and second gateway devices are operably connected such that a second request, sent through the first gateway device, to receive the stored digital media content at the first bit rate from the second gateway device is routed from the first gateway device to the second gateway device.

14. The system of claim 13, further comprising:
a content distribution server located at the second gateway device;
wherein the at least one network media service device is further configured to:
monitor a network for data traffic, a source of the data traffic being the remote ABR server;
on detecting the data traffic, identify the second gateway device as a destination for the data traffic;
verify that content was stored at the second gateway device, wherein the verified content comprise the digital media content at the first bit rate previously received from the remote ABR server; and
associate the verified content with the second gateway device in a digital media index.

15. The system of claim 14, wherein determining that the second gateway device is storing the digital media content at the first bit rate comprises accessing the digital media index.

16. The system of claim 13, wherein the at least one network media service device is further configured to:
receive, from the second gateway device, an indication that the second gateway device is storing the digital media content at the first bit rate; and
associate the digital media content at the first bit rate with the second gateway device in a digital media index, wherein determining that the second gateway device is storing the digital media content at the first bit rate comprises accessing the digital media index.

17. The system of claim 13, wherein determining that the second gateway device is storing the digital media content at the first bit rate comprises:
forwarding the first request to a dispatch device operably connected to and downstream from the remote ABR server; and
receiving the network address of the second gateway device from the dispatch device.

18. The system of claim 13, wherein the at least one network media service device is further configured to:

before returning the network address, determine that a content subscriber associated with the client set top box is subscribed to a media service associated with the digital media content.

19. A gateway device comprising:
a local storage;
and at least one processor configured to:
receive a first request for a first segment of a plurality of segments of digital media content at a first bit rate from a first client set top box;
receive the digital media content at the first bit rate from a remote ABR server on behalf of the first client set top box;
determine whether to store the digital media content at the first bit rate in the local storage based on one or more media indicators;
in response to the determining, store the digital media content at the first bit rate in the local storage in connection with providing the digital media content at the first bit rate to the first client set top box;
receive a second request for the digital media content at the first bit rate from a second client set top box via a remote gateway device, the second client set top box being coupled to the device via the remote gateway device, and the second request being addressed to the remote ABR server and redirected by an intermediate network device to the device without being provided to the remote ABR server; and provide, from the local storage, the digital media content at the first bit rate to the second client set top box as a series of ABR content segments using a local ABR server.

20. The gateway device of claim 19, wherein the local ABR server is configured to encode the digital media content into multiple streams at different bit rates, a stream being associated with a different bit rate from the first bit rate.

21. The gateway device of claim 19, wherein the second client device is downstream of the remote gateway device and not downstream of the device.

* * * * *